US007761507B2

(12) United States Patent  
Herf et al.

(10) Patent No.: US 7,761,507 B2
(45) Date of Patent: Jul. 20, 2010

(54) NETWORKED CHAT AND MEDIA SHARING SYSTEMS AND METHODS

(75) Inventors: Michael Herf, Studio City, CA (US); Robert Bailey, Santa Barbara, CA (US); Brian McBarron, Harrison City, PA (US)

(73) Assignee: Google, Inc., Mountain View, CA (US)

( * ) Notice: Subject to any disclaimer, the term of this patent is extended or adjusted under 35 U.S.C. 154(b) by 1342 days.

(21) Appl. No.: 10/847,194

(22) Filed: May 17, 2004

(65) Prior Publication Data

US 2005/0021624 A1   Jan. 27, 2005

Related U.S. Application Data

(60) Provisional application No. 60/471,407, filed on May 16, 2003.

(51) Int. Cl.  
*G06F 15/16* (2006.01)
(52) U.S. Cl. .................. 709/204; 709/205; 709/206; 709/207; 715/753; 715/758
(58) Field of Classification Search .......... 709/204, 709/207, 219, 205, 206; 345/419, 623; 715/753, 715/758  
See application file for complete search history.

(56) References Cited

U.S. PATENT DOCUMENTS

| | | | |
|---|---|---|---|
| 6,094,662 A | | 7/2000 | Hawes |
| 7,124,166 B2 * | | 10/2006 | Brown ........................ 709/204 |
| 7,392,296 B2 * | | 6/2008 | McIntyre et al. ............ 709/219 |
| 2002/0023132 A1 * | | 2/2002 | Tornabene et al. .......... 709/205 |
| 2002/0126135 A1 | | 9/2002 | Ball et al. |
| 2003/0097408 A1 * | | 5/2003 | Kageyama et al. .......... 709/205 |
| 2003/0154250 A1 * | | 8/2003 | Miyashita ................... 709/204 |
| 2003/0236832 A1 * | | 12/2003 | McIntyre et al. ............ 709/204 |
| 2004/0109023 A1 * | | 6/2004 | Tsuchiya .................... 345/758 |
| 2005/0015444 A1 | | 1/2005 | Rambo |
| 2006/0031310 A1 | | 2/2006 | Lee |

FOREIGN PATENT DOCUMENTS

WO    WO 01/10128 A    2/2001

OTHER PUBLICATIONS

PCT International Search Report for PCT Appln No. US04/15254, mailed Dec. 14, 2006 (3 pages).
PCT Written Opinion for PCT Appln No. US04/15254, mailed Dec. 14, 2006 (3 pages).
Supplementary European Search Report No. EP 04 75 2311, dated Jan. 21, 2008 (3 pages).

* cited by examiner

*Primary Examiner*—Thu Ha T Nguyen
(74) *Attorney, Agent, or Firm*—Blakely, Sokoloff, Taylor & Zafman LLP

(57) ABSTRACT

Methods and systems are provided for sharing images and chat text over a network. A determination is made as to whether a first user of a first terminal has changed focus from a first image to a second image during a chat session conducted with a second user of a second terminal. At least partly in response to determining that the first user of the first terminal has changed focus from the first image to the second image, \a second image identifier is automatically sent to the second terminal. Chat text is transmitted from the first terminal to the second terminal. The second terminal accesses the second image using the second image identifier, and displays the chat text in association with the second image.

51 Claims, 6 Drawing Sheets

NETWORKED CHAT AND MEDIA SHARING SYSTEMS AND METHODS

PRIORITY CLAIM

This application claims the benefit under 35 U.S.C. 119(e) of U.S. Provisional Application No. 60/471,407, filed May 16, 2003, the contents of which are incorporated herein in their entirety.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention is related to electronic chat networks, and in particular, to methods and systems for sharing digital media while electronically chatting over a network.

2. Description of the Related Art

Using the Internet and World Wide Web, or other networks, many people today communicate via "chat rooms". Chat rooms provide a real time virtual forum for interaction among individuals that may be at disparate geographical locations throughout the world. So long as the participants are properly connected to the network and service facilitating the "chat", the individuals can communicate conversationally in real time (the term "chat" is broadly defined herein to mean real time communications between two or more users, and thus is meant to encompass chat rooms, instant messaging, etc.). This interaction can take place via a standard Web browser interface, using a computer or other such enabled device. The information exchanged during the "chat" is typically text-based, using some chat applications, may also include static or dynamic audio data, graphic images such as "emoticons", or some combination thereof.

However, many of these conventional chat applications are slow, cumbersome, and do not show the shared images inline with the corresponding chat text.

SUMMARY OF THE INVENTION

In accordance with the present invention, apparatus and methods are provided for sharing media in conjunction with a chat. In one embodiment, this can further include associating a history of shared media with a chat history. The shared media can include interaction content, such as, by way of example, chat text, image information (e.g., a picture, screenshot, PowerPoint slide, etc.), including pictures, videos, and graphics, or audio data, or some combination thereof. A chat application enables the real time interactive exchange of text and media.

One embodiment of the present invention is a method of performing an electronic chat session including images over a network, the method comprising: providing, using a first terminal, a first image from a first user and an associated first image identifier via a peer-to-peer transfer to a second terminal associated with a second user, wherein the terminal associated with the second user automatically stores the first image in non-volatile memory in association with the first image identifier; during a chat session over a computer network conducted via the first terminal and the second terminal, wherein the first user and the second user are textually conversing, detecting that the first user is focusing on the first image; retransmitting the first image identifier from the first terminal to the second terminal; and at least partly in response to receiving the retransmitted first image identifier, the second terminal: comparing the retransmitted first image identifier to a second identifier associated with a second image already being displayed in a chat history on a first interface to determine if the first identifier and the second identifier are associated with different images, displaying in a first area of the chat history the first image in association with corresponding chat text from the first user at least partly in response to determining that the first identifier and the second identifier are associated with different images.

Another embodiment is a method of performing a chat session over a network, the method comprising: determining if a first user of the first terminal has changed focus from a first image to a second image during a chat session conducted with a second user of a second terminal; automatically sending a second image identifier associated with the second image to the second terminal during the chat session; and transmitting chat text from the first terminal with a second terminal, wherein the second terminal accesses the second image using the second image identifier, and displays the chat text in association with the second image.

Still another embodiment is a method of processing images in an electronic chat session, the method comprising: receiving first chat text at a first terminal associated with a first user from a second user associated with a second terminal; displaying the chat text in a chat area via the first terminal in association with a first image; receiving at the first terminal an image identifier associated with a second image from the second user; and based at least in part on the image identifier and information related to the second image, determining whether the first image and the second image are different images, wherein if the first image and the second image are different image, the second image is retrieved and displayed in the chat history in association with second chat text.

Yet another embodiment is an electronic chat system configured to display media and chat text, the electronic chat system comprising instructions stored in computer readable memory configured to: determine if a first user of a first terminal has changed focus from a first image to a second image during a chat session conducted with a second user of a second terminal; at least partly in response to determining that the first user of the first terminal has changed focus from the first image to the second image, automatically transmit a second image identifier to the second terminal; and transmit chat text from the first terminal with a second terminal, wherein the second image identifier is intended to be used by the second terminal to access and display second image in association with the chat text.

One embodiment is a method for providing instant messaging between at least a first user and a second user over a data communication network, the method comprising: providing to the first user an instant messaging interface; providing within the interface a first area for outputting a document shared between the first user and the second user during a communication session; and providing within the interface a second area for display of a history of the communication session between the first user and the second user.

DETAILED DESCRIPTION OF PREFERRED EMBODIMENTS

Figure 1:
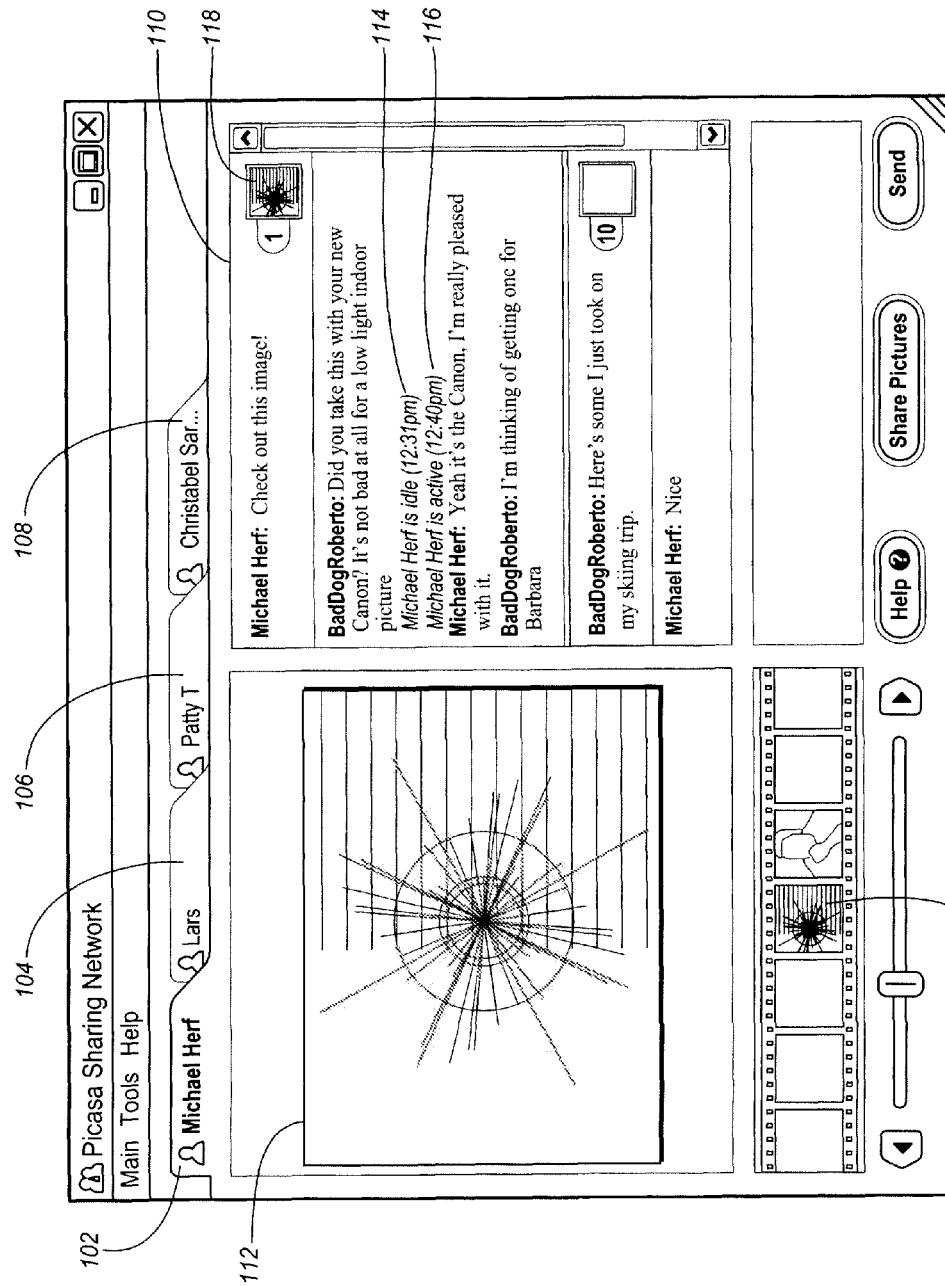
FIG. 1 illustrates a first example user interface.

Throughout the following description, unless otherwise indicated, the functions described herein are preferably performed by software modules including executable code and instructions running on one or more general-purpose computers. The computers can include one or more central processing units (CPUs), that execute program code and process data, memory, including one or more of volatile memory, such as random access memory (RAM) for temporarily storing data and data structures during program execution, non-volatile memory, such as a hard disc drive, optical drive, or FLASH drive, for storing programs, data, and databases, as well as one or more network interfaces for accessing an intranet and/or Internet.

In addition, the computers can include a display for displaying user interfaces, data, photographs, images, and the like The computers can also include one or more user input devices, such as a keyboard, mouse, pointing device, microphone and/or the like, used to navigate, provide commands, enter information, and/or the like. However, the present invention can also be implemented using special purpose computers, state machines, and/or hardwired electronic circuits. In addition, the example processes described herein do not necessarily have to be performed in the described sequence, and not all states have to be reached or performed.

Further, while the following description may refer to "clicking on" a link or button, or pressing a key in order to provide a command or make a selection, the commands or selections can also be made using other input techniques, such as using voice input, pen input, mousing or hovering over an input area, selecting menu options, and/or the like. In addition, while certain processes and functions may be described as being performed separately by a chat application, a file sharing application, and an image management application, the processes and functions can be performed by the same application or by still additional applications.

In addition, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically distributed computer systems that are appropriately linked together over public and/or private networks, such as the Internet, an intranet, peer-to-peer networks, etc. Furthermore, while the following description relates to an embodiment utilizing the Internet and related protocols, other networks, such as networked interactive televisions, and other protocols may be used as well.

As will be described in greater detail herein, an example embodiment of the present invention enables chat participants to exchange chat conversation in combination with media, such as pictures. Advantageously, the embodiment optionally automatically tracks when a chat participant has changed focus to a different media item, such as a different picture, and causes that media, in association with corresponding chat text, on another chat participant's terminal.

In common use, a "chat history" (also sometimes called an "instant message history") often refers to a list of comments typed remotely by two or more networked users, interleaved in the order the comments have been typed. The chat history can be displayed on each participating user's terminal display, and typically includes some mechanism to identify which user made a particular statement and at what time relative to other (user(s)'s) statements. This enables users to independently view the comments and the times at which each comment was made, thus providing a session history for the chat.

In accordance with one embodiment of the invention, a chat client incorporates external media elements, such as video conferencing, picture sharing, and document (such as an image, a text file, a presentation, a web page, a search result, or a blog) sharing, in conjunction with the conversation between the participants of the chat in real time, such that users involved in the chat may interactively display (or otherwise output) media with each other while they communicate via text, voice (e.g., voice-over-IP), etc. Moreover, in accordance with another aspect of the invention, chat history is aligned with such concurrent media sharing history, such that, for example, a user can glance back and understand the conversation topic, and its history of textual and media share information as aligned with each other.

In one embodiment of the present invention, a "snapshot" may be taken of the state of the system when each comment is made, and if the snapshot has changed substantially since the previous line in the conversation, this change is indicated with a thumbnail representing the change. For example, if an image is of a document, scrolling through a document may not be sufficient to present a new snapshot of the scrolled document, while a document annotation or change to another document would be a sufficient change.

In accordance with one aspect of the invention, the chat apparatus and processes described herein enable users to scroll back through the chat history and to view representations (e.g., relatively smaller thumbnails) of the previously viewed versions of the media they were discussing at a given point in time during the chat history. Each change in conversation focus that is detected or inferred, for example, when one of the users is viewing a new or different image, may be indicated with a visual mechanism, e.g., a line of separation.

A user can also click on a media item in the history to gain access to the media item, thereby allowing each participating user in the chat to go back through a chat and view each item being discussed in detail.

Optionally, the invention may include a "picture in picture" view of what the remote buddy or other remote user (i.e., a chat user) is doing. For example, one embodiment provides one or more of:

1. A shared list of pictures or images (not necessarily ordered the same way for each user). As an example, the shared list of pictures or images may be shown as a filmstrip. The pictures can also be shown in other forms, such as in a table format, one at a time or otherwise.

2. A view of the remote user's screen, which may be expressed as a thumbnail, that changes as the remote user changes focus (or view) in a shared list of pictures. By way of example, as the remote user focuses on or selects an image, a unique image identifier is transmitted by the remote user's chat application over the network to the local user's chat application, which then locates the corresponding image on the local user's terminal and displays it to the local user.

3. When an image is being simultaneously viewed (or shared) by two users in conjunction with a chat, the thumbnail of the other user's screen is optionally automatically hidden or otherwise not displayed. By way of example, image identifiers can be transmitted between user terminals and compared. If the image identifiers match, the image of the other user's screen is hidden, minimized, or otherwise not displayed.

4. The ability to click the remote user's thumbnail and shift the local user's focus to the indicated picture in the remote user's thumbnail.

5. The ability to turn on a "Sync" mode that automatically follows the remote user's focus, updating a local user's view whenever the remote user changes its focus. The synchronization process thus enables the remote user to control what is displayed on the local user's display. Thus, in one embodiment, one user can (select to) view in real-time what the other chat user is currently viewing (to "follow" the other user's action with respect to shared media) and the other user may optionally disable the first user's ability to do this.

6. The ability to save each image shared and/or received during a chat session in a selected or designated directory or album. By way of example, the images can be automatically saved by the chat application and/or manually and selectively saved by the user. The user can optionally specify the image resolution of the images or pictures being stored.

An example embodiment of the present invention may manage the recording, presentation and interaction with the chat history via one or more software modules loaded on the server or servers optionally used to host the chat session. Additionally, one or more modules or sets of instructions may be loaded on user devices (for example, client devices, such as a networked desktop computer, personal digital assistant, personal networked video recorder, cellular telephone, image server, or the like). Such modules are optionally downloaded to user devices as Web browser plug-ins or otherwise, installed via computer readable removable storage media, come preinstalled on the user devices' mass memory, or otherwise loaded, by way of example. For convenience, the modules or instructions will be referred to at times as the "chat application." The location of the various chat history functionality or modules may be distributed variously among the computer and network components or devices involved in or supporting the chat.

To help build or increase the number of chat users, a user can add or invite chat contacts, such as friends or business associates. By way of example, a user can invite others to join the user's chat network and ask them to download the chat application. The user can optionally select and add an image, such as a picture of the user, to the invitation. Further, a user can add another user who already has a chat identifier, or add others whose contact or identification information is already in the user's contacts, such as in Microsoft Outlook or other electronic address book.

A user can select pictures to share during a chat session or otherwise by browsing the user's computer memory or local network, by linking directly to an image management's picture or image albums, or by resending one or more images that the user has recently shared with another user. By way of example, the user can select images by clicking on thumbnails, filenames, or other representations of the images. Similarly, the user can share webcam pictures. Optionally, the chat application will automatically recognize a video input connected to the user's terminal, and the user can click or otherwise activate a live capture button to immediately send a captured image frame to another chat application user. Additionally, the user can click a video freeze frame button to capture and view the captured image frame on the user's terminal. The user can repeatedly capture frames until a suitable one for sharing is captured.

Optionally, to share pictures or images, the user can then click on a share pictures button or link. The user is asked to designate one or more recipients by clicking on corresponding recipient identifiers in a contacts, friends, or buddy list presented to the user. The selected image or images are then shared with the designated recipients. In one embodiment, a user can drag-and-drop a file icon representing a picture or other type of media (or non media, such as word processing) document into a portion of the chat application window, which in turn may detect this action and automatically cause the document to be shared in the current chat.

Optionally, the chat application can inform the user via a popup notification, sound alert, or the like, when another chat user is sending an image and/or has logged on, even if the user is using a different application and the chat application is operating in the background.

Embodiments of the present invention will now be described with respect to the example figures.

As illustrated FIG. 1, in an example embodiment, a user interface is presented on each user's device that can be used for chatting. The example user interface includes a pane 110 for rendering and interacting with a chat history, including images shared during the chat. The chat history can also optionally include status information on a chat partner, such as indication and time stamp as to when the chat partner is idle (see stamp 114) and when the chat partner is active (see stamp 116). A media or current image pane 112 allows any of a variety of media and files to be rendered in the same interface. A group of shared media 120 is displayed under the media pane 112, wherein a selected media from the group of media is displayed in the pane 112. By way of example, the chat history may be provided within a Web browser interface, other window-based interface, or using still other types of interfaces. The chat history 110 includes shared images being discussed, such as shared image 118. As illustrated, different size versions of the same image can be displayed in the chat pane, the media pane 112, and the group of shared images area 120. While FIG. 1 is provided as one example interface, other interfaces may also implement the present invention with different layouts or functionality. That is, the present invention is not limited by the implementation of FIG. 1.

In the example chat session illustrated in FIG. 1 four users are participating in the chat: Michael Herf, Lars, PattyT, and Christabel. As is shown, for each user there is provided a selectable tab 102, 104, 106, 108 that causes a window or screen segment 110, also referred to as a chat pane, to render a chat history or log related to the corresponding user.

Figure 2:
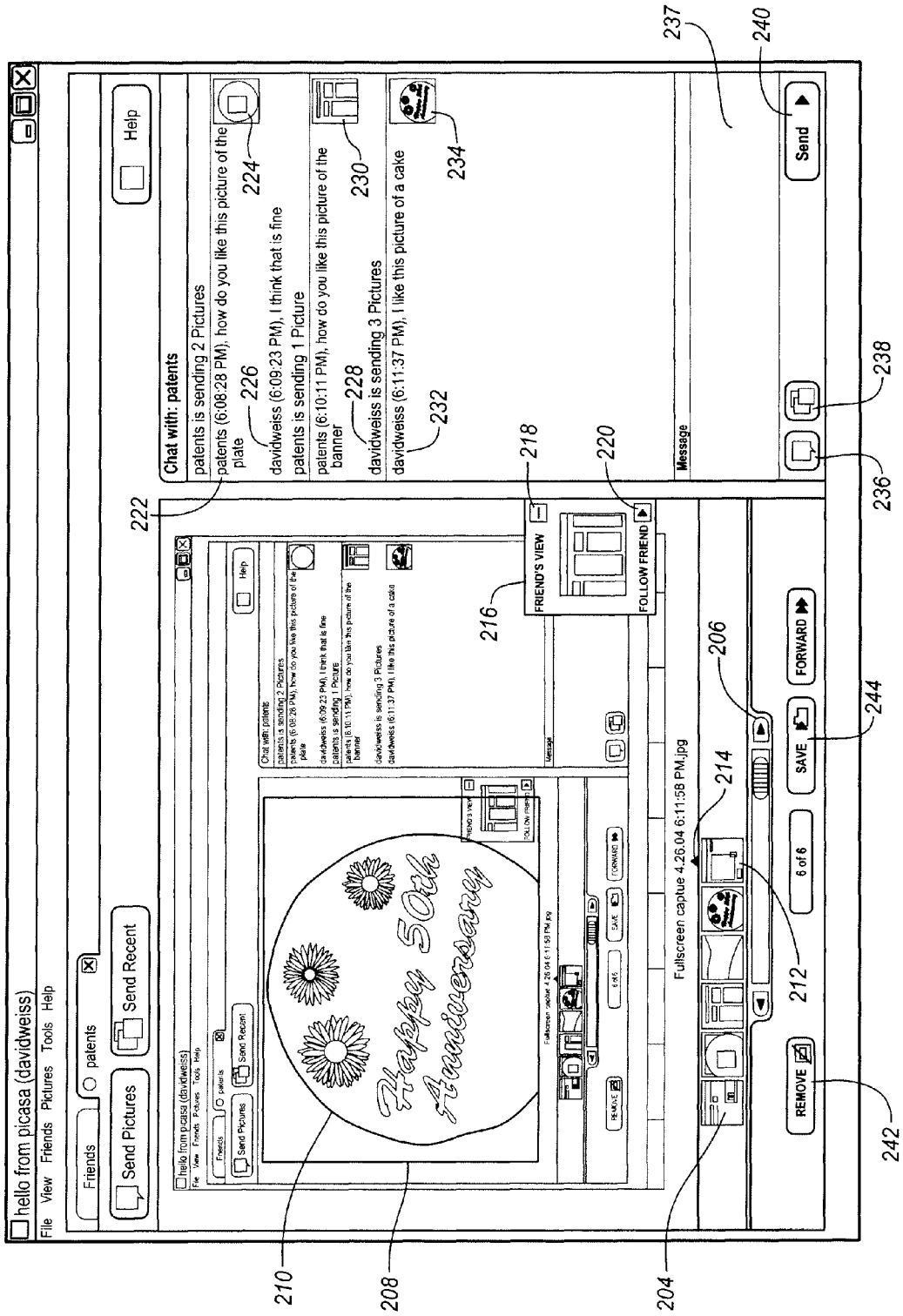
FIG. 2 illustrates a second example user interface.

As illustrated in FIG. 2, a chat interface can include a filmstrip area 204 that displays a shared group of pictures or other images. For example, the filmstrip area 204 can display a sequence of picture or other images sent by the local user to remote user during the chat session, and/or received by the local user from the remote user. The images can be thumbnail size, such as 64×64 pixels, 128 pixels by 128 pixels, 160 pixels by 160 pixels, or other relatively small size, such as less than 1, 2 or 3 inches in a largest dimension. The thumbnail images can be square, rectangular, or of other shape. The user can scroll through the filmstrip using a scroll control 206.

The user can save to non-volatile memory the incoming images displayed or located in the filmstrip and can assign a name to the saved filmstrip. By way of example, the user can click on a save button 244. The user can optionally select a size or resolution for the images in the filmstrip being saved. For example, the user can specify that the images should be saved at the original full resolution and size, or can specify that the images should be saved at a different size and/or resolution. By way of further example, the user can use a slider to specify or select the new size and/or resolution of each image. Optionally, the user may be constrained to saving the resized images to one of a limited number of resolutions, such as within a range of 160 pixels to 1024 pixels for the longest image edge.

The user can modify the filmstrip by commanding the chat application to remove images selected by the user, remove only images sent by the user, remove only images received by the user, or to remove all images. By way of example, the user can hit a delete key or select a remove command, such as by clicking on the remove button 242, to remove one or more selected images from the filmstrip area 204.

The chat interface can further include a current media area 208 that displays a relatively larger version 210 of a filmstrip image 212 selected or indicated by the local user, such as by clicking on the desired image. By way of example, the current media area 208 can be sized to be a desired width or percentage of the width of the user interface, such as 30%, 40%, 50%, 60% the width of the user interface, those other sizes can be used as well. Similarly, the current media area 208 can present images at several times the size and/or resolution (such as, by way of example, 3 times, 4 times, 5 to 10 times, or more) of the filmstrip or chat thumbnail images. An indicator 214 is used to indicate which thumbnail image is being display in the current media area 208. Optionally, the current media area 208 can, by default, automatically display the most recently sent or received image. In addition, by way of example, the user can click on a filmstrip image thumbnail so that is appears in the current media area 208.

Optionally, a default maximum size can be set for images displayed in the current media area 208. For example, the default maximum size can be set to 640 pixels in its largest dimension. Optionally, by selecting or requesting large previews, the chat application scales images to display the maximum size image, according to the size of the source image, to fit the user terminal's display.

In addition, the user can set a maximum dimension for images sent by the chat application. For example, the user can, via a menu, dialog box, or the like, issue a limit picture size command and can enter a number into a field the maximum dimension of the longest image edge that is to be used by the chat application when sending images. In addition, the user can option select a maximum transmission bandwidth that the chat application is to use. In an example embodiment the user can enter into a field or otherwise select a maximum transmission rate, such as in Bps (bits per second) or as a percentage of the available bandwidth, that the chat application is to occupy, such as, for example, when performing a image transfer.

A viewer, such as view controller 216 is provided that shows the user which image or other document in the filmstrip area 204 the remote chat user is currently viewing, and enables the local chat user to determine whether to follows the remote user's focus and to view in the current media area 208 the same image or other document that the remote user is viewing, or to instead let the local user select which image to view. For example, if the user clicks on or otherwise activates a "follow friend" control 220, the remote user's view is presented in the current media area 208. Thus, the user view in the current media area 208 will follow the remote user's view, enabling the user to follow the remote user via the current media area 208 as the remote user clicks through his or her filmstrip. Otherwise, the current media area 208 will display an image selected by the local user, and the view controller 216 will display the image the remote user is viewing. If the local user had selected control 220, selection of an image in the thumbnail area 204 causes the selected image to be displayed in the current view area 208 and optionally disables the following mode. Activation of control 218 causes the view controller to be minimized so as to block the view of the current media area 208. Optionally, a user can prevent or disallow selected or all remote users from following or experiencing the user's actions or views by way of a view controller. By way of example, a user can optionally specify a preference for each other user in the user's contact or buddy database, wherein the preference specifies whether a given other user is allowed or not allowed to follow or experience the user' actions via the view controller. The preference can be stored in a the user account database or contact database and recalled when a chat session with another user is initiated. Optionally, this preference can be manually overridden by the user during a chat session. Optionally, the view controller 216, or portions thereof, can be semi-transparent and can overlay portions of the current media area 208 and/or the chat history or chat window 202.

For other files, such as, by way of example, audio files, video files, document files and so on, thumbnails or other representations are optionally also provided, wherein the filmstrip area 204 and current media area 208 provide areas for presentation of those files, and for corresponding controls. For example, for files that have a time component, such as audio or video media, the controls can include fast forward, reverse, play, and pause controls.

A chat window 202 is provided that displays a scrollable or otherwise navigable transcript of the chat text displayed in association with corresponding thumbnails of pictures. As illustrated, the transcript is segmented into lines of text corresponding to the picture that was the focus at the time chat text was sent. The transcript further includes a time and date stamp indicating when text, images or other documents were sent and/or received.

A user can scroll back through the chat window and view the chat text and corresponding pictures via a scroll bar, using cursor controls, a mouse scroll wheel, or otherwise. As discussed herein, a detected or inferred change in conversation focus may be indicated with a visual mechanism, such as by way of example, a line of separation, change in color, emphasis, or the like.

A message area 237 is provided wherein the local user can type in or otherwise enter chat text to be sent to the remote user. If the local user is focusing on a different image than that previously chatted (such as by selecting a different image in the filmstrip area 204 and/or viewing a different image in the current view area 208), activation of a send button 240 causes the image identifier associated with the image displayed in the current view area 208 to be automatically sent in conjunction with the corresponding chat text entered in the message area 237. The user does not have to activate a separate send image button or the like. The remote user's chat application will then place a visual mechanism, such as by way of example, a line of separation, change in color, emphasis, or the like to separate it from the previous chat text. Optionally, the local user's chat application sends the image identifier associated with the image in the current view area 208 each time the chat send button 240 is activated, even if the local user's image focus has not changed, and the remote user's receiving chat application compares the image identifier with that associated with the last image presented in the remote user's chat history. If the identifier is different, the visual indicator in the chat is used to show a subject change, and the chat application retrieves the corresponding image from memory, and displays the retrieved image in conjunction with the chat text in the chat window 202.

For example, chat text 222, which discusses the plate in picture 224, is time stamped (which can provide an absolute or relative time when the text and/or image was received and/or sent) and displayed in association with the picture 224, wherein the local user "patents" was viewing that picture in the current view area 208 when the local user sent the corresponding text "how do you like this picture of the plate" to the remote user "davidweiss" by entering the chat text in the message area 237 and activating the send button 240. Advantageously, the local user was not required to proceed through a complex image selection and insertion process in order to have the picture 224 displayed in association with the chat text 222 on either the local user's terminal or the remote user's terminal.

Chat text 226 from the remote user is not displayed next to a new picture as the remote user has not changed focus to another picture when sending the text "I think that its fine." Chat text 228, from the local user "patents" to the remote user "davidweiss", which discusses the banner in picture 230, is displayed in association with the picture 230 because the local user had changed focus to picture 230. The remote user "davidweiss" then changed his focus to the picture 234 when sending the chat text 232, which discusses the cake in picture 234, so the chat text 232 is displayed in association with the picture 234, wherein the identifier for picture 234 was sent by the remote user's terminal in association with the chat text to the local user "patents."

The user can also manually search for and select images to be shared. For example, the user can activate an image selection button 236 to cause an image browser, or the like, to be presented. The user can select images displayed in the browser to be sent to the remote user or users. Activation of a recent pictures button 238 will cause pictures or other images recently sent by and/or to the local user to be displayed as a group on an interface page. For example, the recent images interface page can display the last 10 or other number of shared images, or images from the last one, two, or other desired number of chat sessions. The local user can select one or more of the recently shared images for sharing during the current chat session. Activation of the send button 240 causes the selected images to be transmitted to the selected remote users in conjunction with the corresponding chat text.

By way of further example, referring back to FIG. 1, Michael Herf's tab has been selected and chat history window for Michael Herf is active or prominent. Since Michael Herf's window is active, attachments included in Michael Herf's messages are selectable. As illustrated, adjacent to Michael Herf's text message "Check out this image!" is an image icon (or thumbnail). In this example, the corresponding image is shown in the media window pane provided to the left of the chat history pane (on right). In this example, the images for other users are grayed out to indicate that the other users' chat tabs have not been selected. In other embodiments, images for a plurality of users are selectable from a single user's window.

Figure 3A:
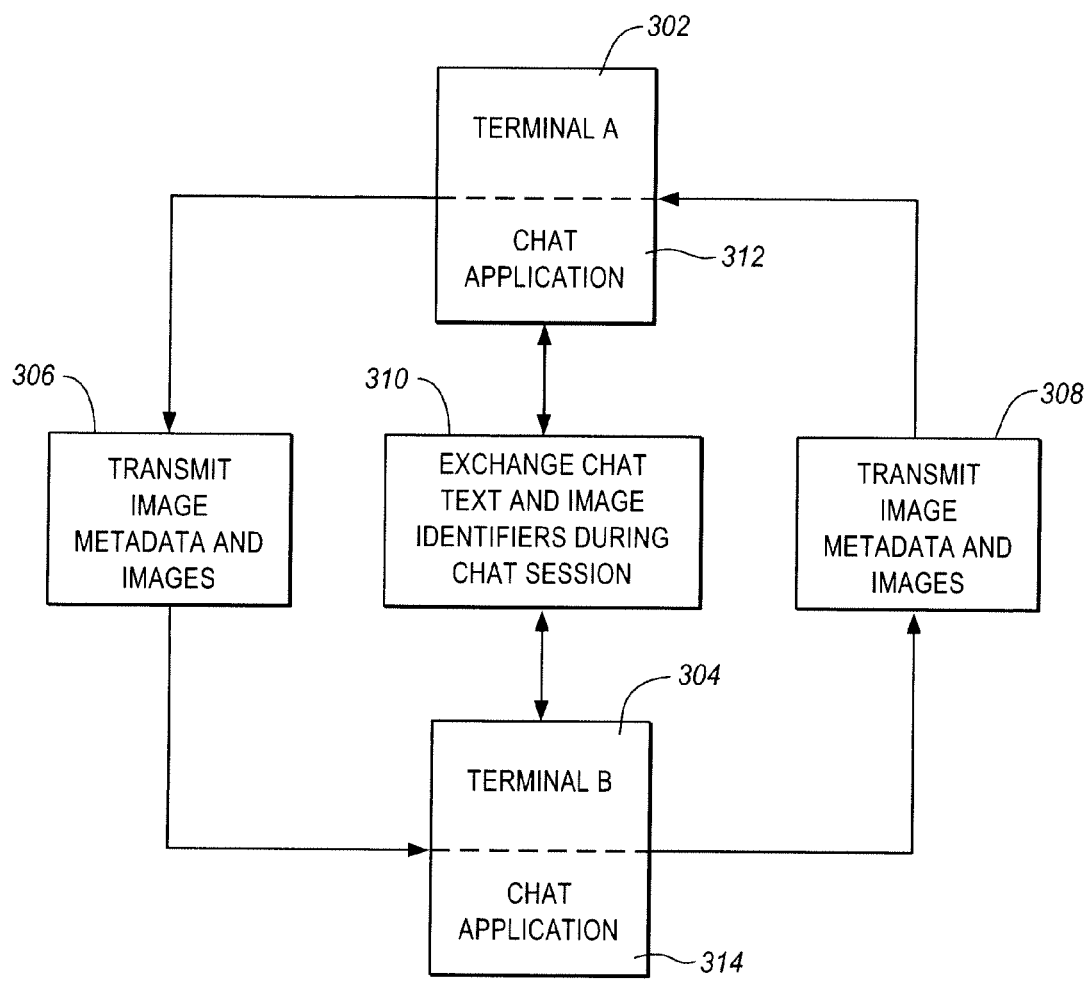
FIGS. 3A-B illustrate an example system architecture and chat process.

FIG. 3A illustrates an example system architecture and chat/instant messaging process between two user terminals 302, 304. While, for the sake of clarity, only two terminals are illustrated in FIG. 3A, additional users and user terminals can be included in a given chat process.

At state 306, Terminal A 302, hosting a chat application 312 transmits one or more images and associated metadata over a network, such as the Internet, to Terminal B 304, hosting a chat application 314. Terminal B 304 optionally automatically stores the one or more images in non-volatile memory, such as on a disc drive. Optionally, at state 308, Terminal B 304, hosting a chat application 314 transmits one or more images and associated metadata over a network, such as the Internet, to Terminal A 302, hosting a chat application 312. Terminal A 302 optionally automatically stores the one or more images, such as in non-volatile memory, for example, on a disc drive. States 306 and/or 308 can take place before or during a chat session and can occur sequentially or in parallel. In addition, the metadata and corresponding images do not have to be transmitted together or in the same packet, though in one embodiment, the metadata and corresponding images are transmitted together. The transmitted images can then be included in a chat session. Each of the images and the corresponding metadata, or portions thereof, such as the image identifier, can be stored in association with each other on the receiving terminal.

The metadata and images provided at states 306, 308 can be provided to either terminal 302, 304 using a variety of techniques. By way of example, and not limitation, a peer-to-peer method for sharing images over a network can be used wherein a first user, such as the user of Terminal A 302, selects one or more images to share via the chat or other image sharing application. The first user's chat or other image sharing application then transmits to a designated recipient terminal, such as Terminal B 304, permission data including, for example, image identification information. The recipient terminal can be associated with a recipient user. The recipient's chat or other image sharing application can optionally automatically transmit an image request for the corresponding images from the recipient's terminal to the first user's terminal, the image including image identification information and a requested resolution. In response to receiving the image request, the first user's application can optionally scale the images to the requested resolution, optionally encrypt the images, and then transmit the encrypted, scaled images to the recipient's terminal.

Still other techniques can be used for sending images. For example, the images and associated metadata can be emailed by the first user to the recipient, or the recipient can optionally download the images and metadata from a Web site.

The foregoing processes and systems are discussed in greater detail in copending application, titled "Methods and Systems for Image Sharing Over a Network", Ser. No. 10/847,536), the contents of which are incorporated by reference herein in their entirety.

The example metadata can include one or more of an image identifier (image iid), a user identifier (uid), a machine identifier (mid), a second user identifier (uid), an image width (width), an image height (height), a container or file identifier or hint (container), an image file name (filename), an image file size (filesize), a file content signature (md5), a file modification time (filemodetime). In an example embodiment, a unique image ID is defined by the combination of the image identifier, the user identifier, and the machine identifier.

At state 310 the chat process is performed, wherein chat text and image identifiers for images being chatted about are exchanged by Terminal A 302 and Terminal B 304. State 310 can be repeatedly performed during a given chat session.

Figure 3B:
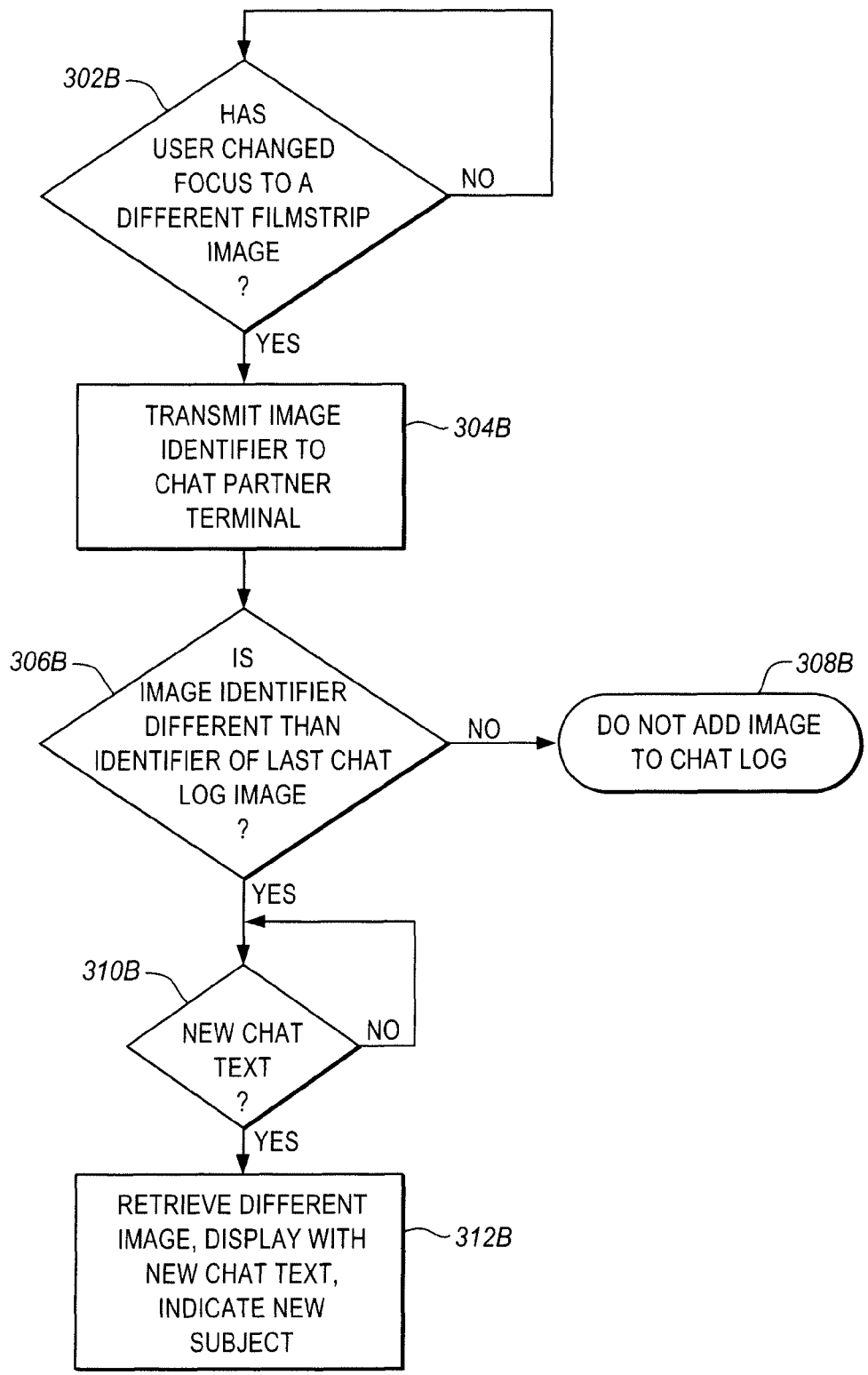

FIG. 3B illustrates an example chat process, such as that illustrated by state 310 in FIG. 3A, in greater detail. At state 302B, the chat application monitors a first user's focus and determined when the first user has changed focus to a different media, for example, by pointing to an image in the first user's filmstrip, by tabbing over to a given image using a tab key or the like, or by clicking on a filmstrip image and manually providing a send command. If the chat application determines that the first user has changed focus to a different media, such as a different image, the process proceeds to state 304B and image identification data for the different image is sent by the first user's chat application from the first user's terminal to the recipient's terminal. At state 306B, the recipient's chat application determines if the image identification data is different than for the last image displayed in recipient's chat history. If the image identification data is the same, indicating that the focus is the same as when the last textual chat was presented, then, at state 308B, no new image is displayed in the chat history.

If the image identification data is different than that for the last image presented in the chat history, at state 310B the recipient's chat application determines if new chat text has been received from the first user. If new chat text has been received, the process proceeds to state 312B, and the recipient's chat application then utilizes the image identification data to locate and retrieve the corresponding image, which is stored on the recipient's terminal or local network, such as in volatile or non-volatile memory. The recipient's chat application then causes the image to be presented in the recipient's chat area in line or association with the corresponding chat text. A visual separator can be provided to indicate a new subject (the new image) is being discussed. In addition, the selected image can be displayed in the view controller display area, and/or in the recipient's current media area, as similarly discussed above.

While the following example assumes that images or pictures are being transferred in connection with a chat session, the processes and systems can also be applied to combining chat with other types of media, such as audio media. Icons representing the audio media can be displayed during a chat session, and clicking on the icons causes the corresponding audio media to be played by an audio media player.

Figure 4:
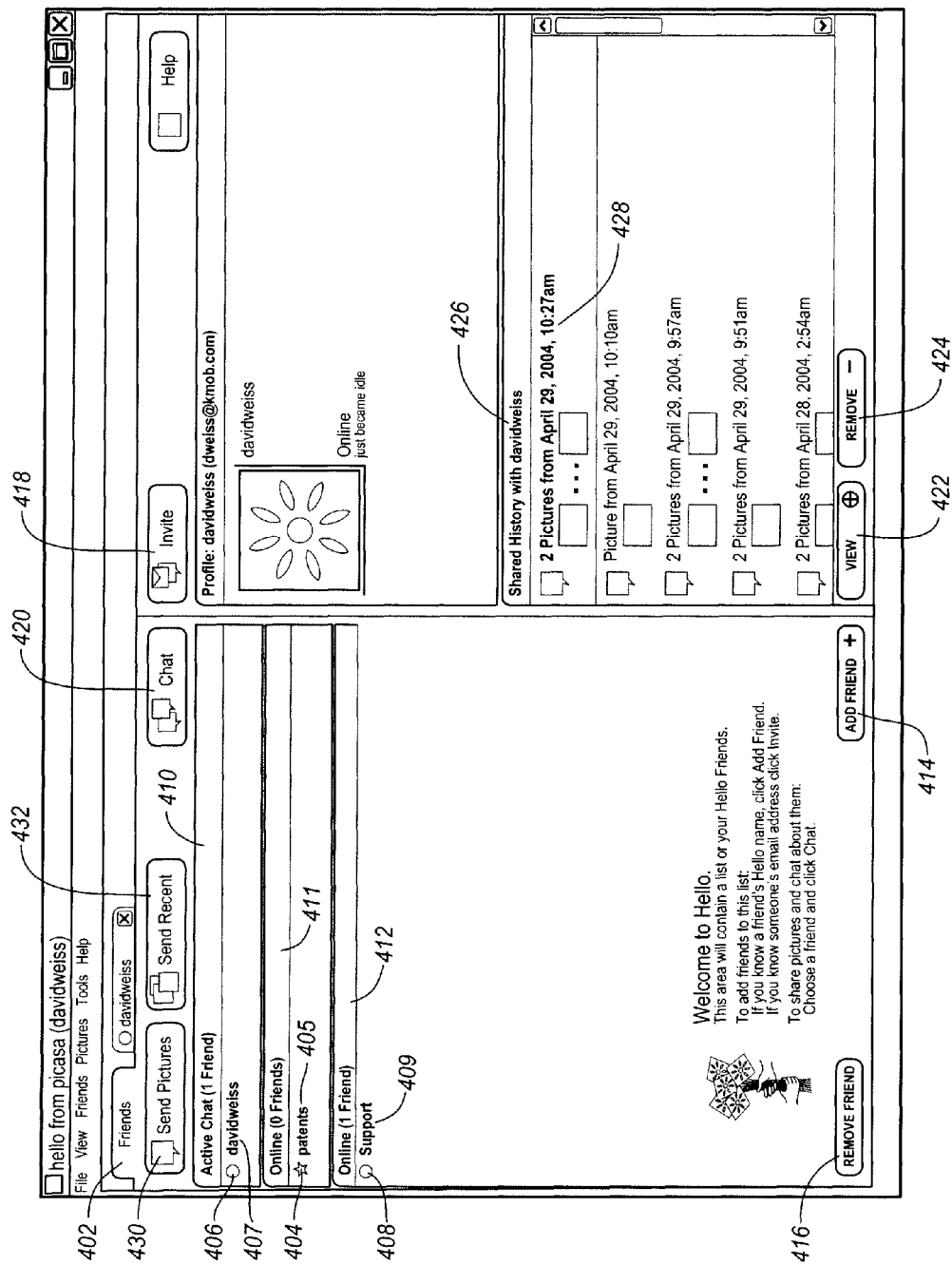
FIG. 4 illustrates an example chat contacts user interface.

As illustrated in FIG. 4, one embodiment enables a user to identify the user's friends or contacts with whom the user may wish to share media, such as pictures, via a "friends" or contacts tabbed page 402. The chat application identifies which of the user's contacts are online and/or available to share or exchange images, as well as which of the user's contacts are idle or offline. An active chat list or history can be provided that displays the most recent chat during a current login session with a contact for which there is an open chat panel. In the example interface, an active chat area 410 lists those remote user's with whom the local user is having an active chat session. An online area 411 lists online users who are in the local user's chat network, but with whom there is not an active session. A star 404 is used to designate the local user and is displayed in association with the local user's identifier 405. Also within the online area 410, a green disc or other indicator can be displayed is associated with a remote user identifier to indicate that a remote user is online. A user can click on an identifier associated with an online user or click the chat button 420 to establish a chat session with an online user.

An offline area 412 lists offline chat contacts. In this example, a red disc 408 is used to indicate that remote user "support" 409 is offline. If the local user has attempted to send one or more pictures or other images to an offline user, a notification will be displayed adjacent to the offline user identifier indicating how many images or pictures are queued, waiting for the offline user to go online. Once the offline user goes online, the queue notification will no longer be displayed.

An "add friend" button 414 is used to add contacts to the user's chat network. By way of further example, by activating an invite button 418, a user can invite others to join the user's chat network and ask them to download the chat application. A user can delete a chat contact by activating the "remove friend" button 416 and then selecting from a list or database the user or users to be deleted.

A user can send images to another user by clicking on the "send pictures" button 430. The user can then select pictures or other images to share during a chat session, or otherwise, by browsing the user's computer memory or local network, or by linking directly to an image management's picture or image albums. The user can also click on "send recent" button 432 to be presented with a page displaying recently sent pictures, and then enabling the user to resend one or more of the recently shared images with others.

A user can click on, or otherwise select an item, such as chat log 428, in a shared history list area 426, click on a view button 422 to open a chat log page, via a browser or otherwise, that accesses and displays the transcript for that particular chat, along with thumbnails for images exchanged during that conversation. Optionally, the listing of chat items in the shared history list area 426 can include a display of images, such as the first and/or last image, shared during the corresponding chat session, the number of images exchanged, and the time and date of the chat session. Optionally, the chat log 428 can be automatically stored in non-volatile memory during or immediately after the chat. During the selection process, the selected chat log can be emphasized, such as by a special color, border, indicator or the like, to indicate that the chat log has been selected. A user can delete a shared history item by selecting it and activating a remove command button 424.

Figure 5:
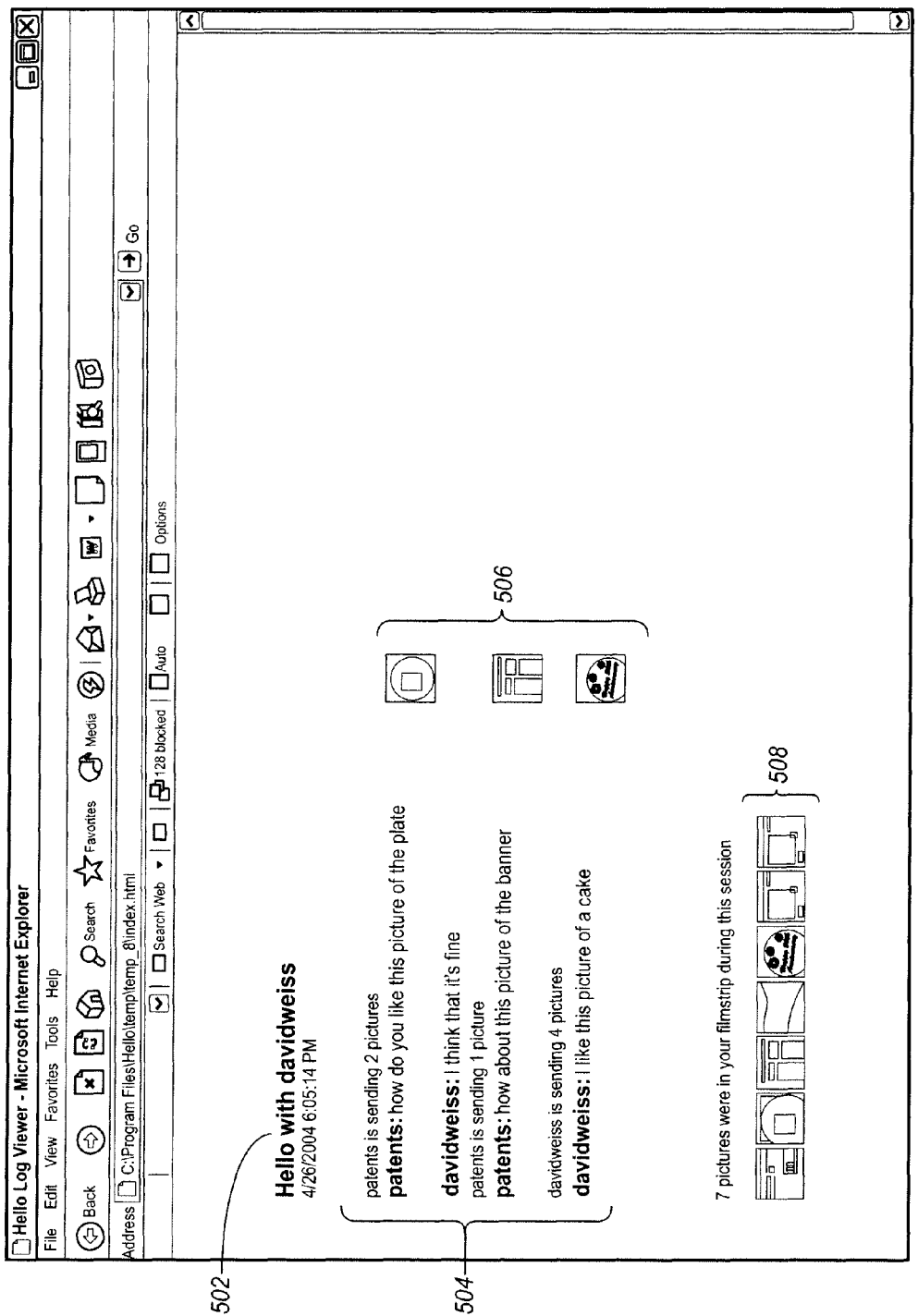
FIG. 5 illustrates an example chat log.

FIG. 5 illustrates an example chat log corresponding to an item from a shared history in FIG. 4. The chat log, by way of example, can be stored in memory, such as non-volatile memory, on the user's terminal or local networked drive. The log includes the identifier 502 of the remote chat user, the chat text and shared media 506, and the images that were in the local user's filmstrip 508.

Profile information regarding the user's contacts, including one or more of the contacts' email addresses, optional profile pictures, location (such as user's city, state, or home, work, or the like), chat ID, and a brief description of the contacts provided by the contacts is displayed by the chat application.

A user can edit his or her profile via one or more profile dialog boxes. In addition, a user can provide the user's real name or nickname. All or a portion of a user's profile can be shared with chat partners during a chat session and/or at other times.

While the foregoing has described what are considered to be the preferred embodiments and other illustrative embodiments, it is understood that various modifications may be made therein and that the invention or inventions may be implemented in various forms and embodiments, and that they may be applied in numerous applications, only some of which have been described herein. For example, the push-pull method could be used with any of a variety of large files, and is not restricted to image files. For example, some other files may include text files, audio files (e.g., "wav" files), audiovisual files (e.g., "mpeg" files), and so on.

What is claimed is:

1. A method of performing an electronic chat session including images over a network, the method comprising:
    sending, from a first terminal associated with a first user to a second terminal associated with a second user, a first image and an associated first image identifier;

storing the first image and the first image identifier in a memory of the second terminal;

displaying a second image associated with a second image identifier in a chat history on the second terminal after storing the first image and the first image identifier;

detecting at the first terminal that the first user is focusing on the first image during a chat session conducted between the first terminal and the second terminal after displaying the second image on the second terminal;

sending chat text for the chat session from the first terminal to the second terminal;

resending the first image identifier from the first terminal to the second terminal in response to the detecting;

receiving the resent first image identifier from the first terminal at the second terminal;

comparing the resent first image identifier to the second image identifier to determine if the first image identifier and the second image identifier are associated with different images in response to receiving the resent first image identifier at the second terminal, retrieving, at least partly in response to determining that the first image identifier and the second image identifier are associated with different images, the first image from memory at the second terminal in response to receiving the resent first image identifier;

displaying in the chat history of the second terminal the first image in association with the received chat text from the first user, after retrieving the first image.

2. The method of claim 1, further comprising:

determining at the first terminal that the first user is focusing on a third image;

sending a third image identifier to the second terminal in response to determining that the first user is focusing on the third image, the third image identifier associated with the third image;

displaying the third image adjacent to chat text corresponding to the third image on the second terminal in a second area of the chat history;

displaying the first image adjacent to chat text corresponding to the first image on the second terminal in a first area of the chat history; and displaying a visual separator between the first area and second area to separate at least the chat text corresponding to the first image and the chat text corresponding to the third image.

3. The method of claim 2, wherein the separator is a line.

4. The method of claim 2, wherein the separator is a change in color.

5. The method of claim 1, wherein the first image is displayed at a second location, displaced from the chat history, in a group of other images.

6. The method of claim 5, wherein the first image is displayed at two additional locations on the second terminal, the two additional locations including:

a group of shared images, wherein the first image is displayed as a thumbnail sized image; and a current media area that displays a selected shared image from the group of shared images at a larger image size.

7. The method of claim 6, wherein an indicator indicates which shared image in the group of shared images is being displayed in the current media area.

8. The method of claim 6, further comprising providing a delete control that when user activated causes at least a first shared image to be removed from the group of shared images.

9. The method of claim 6, wherein the group of shared images is displayed as a filmstrip.

10. The method of claim 1, further comprising:
transmitting a third image to the second terminal;
detecting when the first user is focusing on the third image on the first terminal;
automatically sending a third image identifier associated with the third image at least partly in response to detecting that the first user is focusing on a third image; and
displaying the third image in a viewer second terminal, the viewer separate from the chat history and configured to automatically synchronize with the image upon which the first user is focusing.

11. The method of claim 1, further comprising providing a viewer on a first interface of the second terminal, the viewer configured to automatically track images upon which a remote viewer is focusing.

12. The method of claim 11, further comprising:
determining if the second user and the remote user are viewing the same image; and
ceasing the display of the viewer at least partly in response to determining that the second user and the remote user are viewing the same image,.

13. The method of claim 1, wherein detecting that the first user is focusing on the first image further comprises detecting when the first user has pointed to the first image, and wherein the first image is displayed in a group of previously shared images.

14. The method of claim 1, further comprising automatically storing a history of the chat text and the first image in a non-volatile memory of the first terminal.

15. The method of claim 1, wherein the first image identifier includes a user identifier and a machine identifier.

16. The method of claim 1, further comprising displaying on the second terminal a group of images sent by the first user to the second terminal prior to sending chat text on a first interface displaced from chat text exchanged between the first and second users.

17. The method of claim 1, further comprising displaying status on other users in the second user's chat network on the second terminal.

18. The method of claim 17, wherein displaying status includes displaying one of an online, offline, and idle status.

19. The method of claim 1, further comprising the first user inviting other users to become chat participants of the chat session.

20. The method of claim 19, wherein inviting other users to become chat participants comprises selecting entries in an electronic address book of the first terminal.

21. The method of claim 1, further comprising displaying on the second terminal:
a filmstrip area displaying a group of images shared by the first and second users; and
a current image area.

22. A method of performing a chat session over a network, the method comprising:
sending a first image and a first image identifier associated with the first image to a second terminal during the chat session; and
determining if a first user of a first terminal has changed focus from a second image to the first image during a chat session conducted with a second user of the second terminal after sending the first image and the first image identifier;
automatically resending the first image identifier to the second terminal during the chat session if the first user has focused on the first image from the second image; and transmitting chat text from the first terminal to the second terminal, wherein the second terminal compares the resent first image identifier to an identifier of the second image to determine if the first image identifier and the second image identifier are associated with different, accesses the first image from local memory using the resent first image identifier if the images are different, and displays the chat text in association with the first image terminal after displaying the second image on the second terminal.

23. The method of claim 22, further comprising displaying on the first terminal a shared history listing of prior chat sessions with the second user, the shared history listing including images from the listed prior chat sessions.

24. The method of claim 22, further comprising displaying on the first terminal a shared history listing of prior chat sessions with the second user, the shared history listing including information on how many images were sent each listed prior chat session.

25. The method of claim 22, wherein resending the first image identifier comprises sending the first image identifier without resending the associated first image.

26. The method of claim 22, wherein determining if a user has changed focus comprises determining if a user has pointed at a thumbnail of a displayed image.

27. The method of claim 22, further comprising displaying a visible separator between the new chat text and previous chat text if the second image identifier and third image identifier do not match.

28. The method of claim 22, further comprising:
tracking images viewed by the second user on the second terminal; and
synchronously displaying in a first area on the first terminal images being viewed by the second user on the second terminal while the first user and second user are conducting an electronic chat session via the first terminal and the second terminal.

29. The method of claim 22, further comprising automatically storing a log of chat communication and images shared during a chat session in a memory of the first terminal for later retrieval.

30. The method of claim 22, wherein the first image identifier comprises:
a local image identifier;
a user identifier; and
a machine identifier.

31. The method of claim 22, further comprising: displaying as a group recently shared images at the first terminal; and
receiving from the first user a selection of images in the group of recently shared images; and
sharing the selected images with at least one remote user.

32. The method of claim 22, further comprising:
transmitting the second image from the first terminal to the second terminal for storing in a memory of the second terminal.

33. The method of claim 22, further comprising providing a plurality of accessible chat windows on the first terminal corresponding to a plurality of chat sessions with different users.

34. The method of claim 22, further comprising receiving from the first user a selection at the first terminal of a maximum transmission rate to be used for chatting.

35. A method of processing images in an electronic chat session, the method comprising:

receiving a second image and a second image identifier at a first terminal from a second terminal, wherein the second image is associated with the second image identifier;

storing the second image at the first terminal;

receiving first chat text at a first terminal associated with a first user from a second user associated with the second terminal;

displaying the first chat text in a first chat area at the first terminal in association with a first image;

receiving, at later time, the second image identifier associated with the second image at the first terminal from the second user after displaying the first image on the first terminal;

comparing second image identifier, received at later time, to a first image identifier to determine if the first image identifier and the second image identifier are associated with different images;

retrieving the second image from the memory of the first terminal in response to receiving the second image identifier if the first and second image identifiers are different; and displaying the second image at the first terminal after displaying the first image on the first terminal.

36. The method of claim 35, wherein displaying the second image comprises displaying the second image in a second chat history in association with second chat text.

37. The method of claim 36, wherein the second chat text is received after the image identifier.

38. An electronic chat system configured to display media and chat text, the electronic chat system comprising instructions stored in computer readable non-transitory memory configured to:

send a first image and a first image identifier associated with the first image to a second terminal during the chat session; and determine if a first user of a first terminal has changed focus from a second image to the first image during a chat session conducted with a second user of the second terminal after sending the first image and the first image identifier;

automatically resend the first image identifier to the second terminal during the chat session if the first user has focused on the first image from the second image; and transmit chat text from the first terminal to the second terminal, wherein the second terminal compares the resent first image identifier to an identifier of the second image to determine if the first image identifier and the second image identifier are associated with different images, accesses the first image from local memory using the resent first image identifier if the images are different, and displays the chat text in association with the first image after displaying the second image on the second terminal.

39. The electronic chat system of claim 38, wherein the first image identifier includes: a user identifier; and a machine identifier.

40. The electronic chat system of claim 38, wherein the first image is a digital photograph.

41. The electronic chat system of claim 38, wherein the first image is a graphic image.

42. The electronic chat system of claim 38, further comprising instructions stored in computer readable memory configured to:

display a first area at the first terminal containing thumbnails of shared images, including a thumbnail of the second image;

display a second area at the first terminal containing a substantially larger than thumbnail version of the second image at least partly in response to the first user pointing at the thumbnail version of the second image; and display a third area at the first terminal containing the second image in association with the chat text, wherein the first area, second area, and third area are displayed at the same time.

43. The electronic chat system of claim 38, further comprising instructions stored in computer readable memory configured to synchronously display in a viewer on the first terminal containing images viewed by a second user associated with the second terminal during a chat session with the first user.

44. An electronic chat system configured to display media and chat text, the electronic chat system comprising instructions stored in computer readable non-transitory memory configured to:

receive a second image and a second image identifier at a first terminal from a second terminal, wherin the second image is associated with the second image identifier;

store the second image at the first terminal;

receive first chat text at a first terminal associated with a first user from a second user associated with the second terminal;

display the first chat text in a first chat area at the first terminal in association with a first image;

receive, at later time, the second image identifier associated with the second image at the first terminal from the second user after displaying the first image on the first terminal;

compare the second image identifier received at later time to a first image identifier to determine if the first image identifier and the second image identifier are associated with different images;

retrieve the second image from the memory of the first terminal in response to receiving the second image identifier if the first and second image identifiers are different; and display the second image at the first terminal after displaying the first image on the first terminal.

45. The electronic chat system of claim 44, further comprising instructions stored in computer readable memory configured to display a visual separator to visually separate chat text associated with the first image from chat text associated with the second image based at least in part on receiving an indication that the second user has changed focus from the first image to the second image.

46. The electronic chat system of claim 44, wherein the image identifier includes:

a user identifier; and a machine identifier.

47. The electronic chat system of claim 44, wherein the first image is a digital photograph.

48. The electronic chat system of claim 44, wherein the second image is a graphic image.

49. The electronic chat system of claim 44, further comprising instructions stored in computer readable memory configured to:

display a first area configured to contain thumbnails of shared images, including a thumbnail of the second image; and a second area configured to display a substantially larger than thumbnail version of the second image at least partly in response to the second user pointing at the thumbnail version of the second image, wherein the first area, second area, and the chat text are displayed at the same time.

50. The electronic chat system of claim 44, further comprising instructions stored in computer readable memory configured to synchronously display in a viewing area on the first terminal images being viewed by the second user during the chat session.

51. The electronic chat system of claim 44, further comprising instructions stored in computer readable memory configured to automatically store the chat text and the second image in association with the chat text in a chat log in non-volatile memory at the first terminal.

* * * * *

UNITED STATES PATENT AND TRADEMARK OFFICE
CERTIFICATE OF CORRECTION

| | | |
|---|---|---|
| PATENT NO. | : 7,761,507 B2 | Page 1 of 1 |
| APPLICATION NO. | : 10/847194 | |
| DATED | : July 20, 2010 | |
| INVENTOR(S) | : Michael Herf et al. | |

It is certified that error appears in the above-identified patent and that said Letters Patent is hereby corrected as shown below:

In the Claims

In Column 14, Line 54, Claim 22, please correct as follows:

22. A method of performing a chat session over a network, the method comprising:
sending a first image and a first image identifier associated with the first image to a second terminal during the chat session; ~~and~~
determining if a first user of a first terminal has changed focus from a second image to the first image during a chat session conducted with a second user of the second terminal after sending the first image and the first image identifier;
automatically resending the first image identifier to the second terminal during the chat session if the first user has focused on the first image from the second image; and
transmitting chat text from the first terminal to the second terminal, wherein the second terminal compares the resent first image identifier to an identifier of the second image to determine if the first image identifier and the second image identifier are associated with different <u>images</u>, accesses the first image from local memory using the resent first image identifier if the images are different, and displays the chat text in association with the first image terminal after displaying the second image on the second terminal.

Signed and Sealed this
Eleventh Day of March, 2014

Michelle K. Lee
*Deputy Director of the United States Patent and Trademark Office*